July 25, 1967     L. D. MASSER     3,332,701
SUSPENSION FOR AUTOMOTIVE VEHICLES
Filed June 10, 1965     2 Sheets-Sheet 1
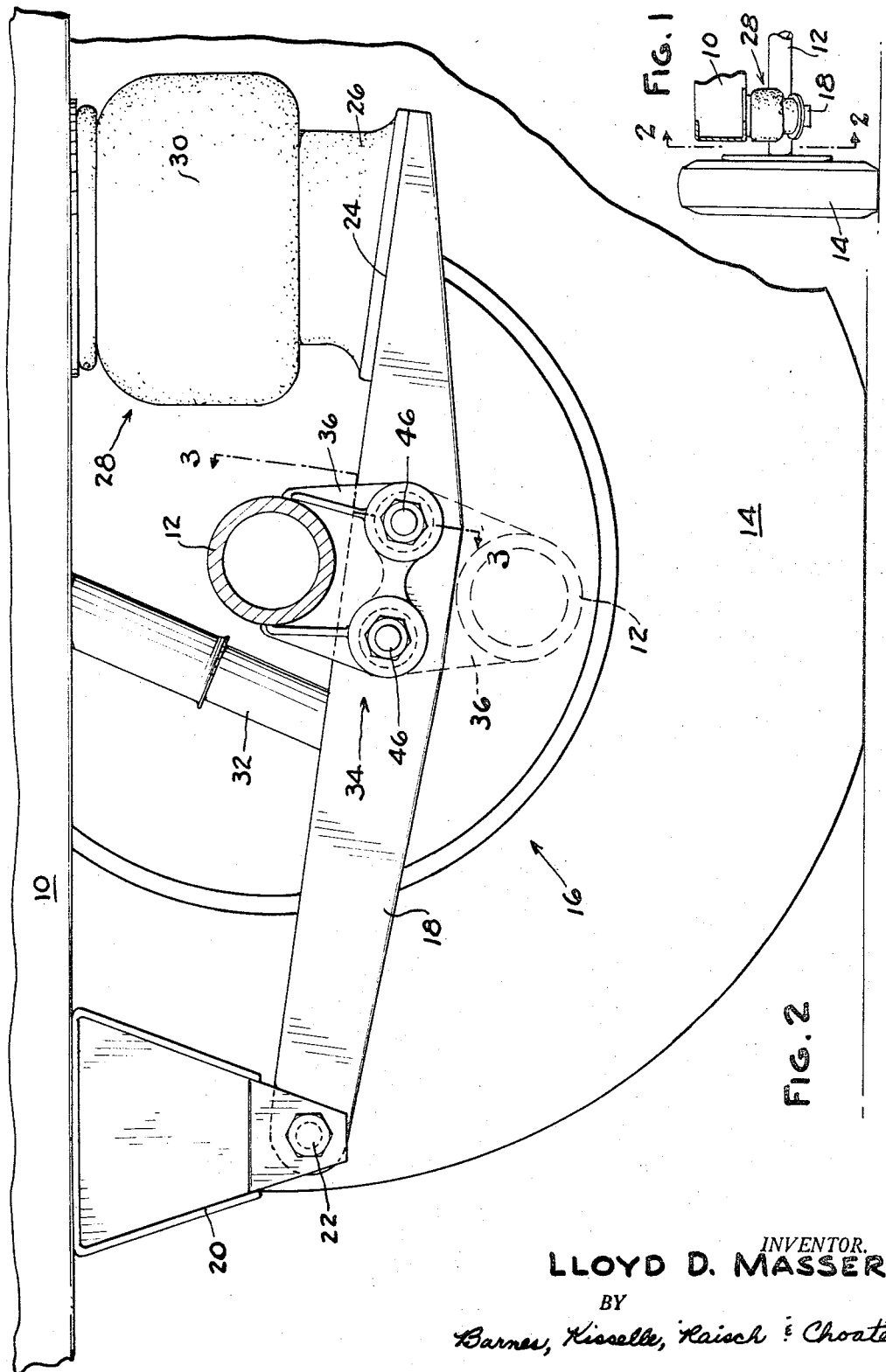
INVENTOR.
LLOYD D. MASSER
BY
*Barnes, Kisselle, Raisch & Choate*
ATTORNEYS July 25, 1967  L. D. MASSER  3,332,701
SUSPENSION FOR AUTOMOTIVE VEHICLES
Filed June 10, 1965  2 Sheets-Sheet 2

INVENTOR.
LLOYD D. MASSER
BY
Barnes, Kisselle, Raisch & Choate
ATTORNEYS

United States Patent Office 3,332,701
Patented July 25, 1967

3,332,701
SUSPENSION FOR AUTOMOTIVE VEHICLES
Lloyd D. Masser, Muskegon, Mich., assignor to Neway Equipment Company, Muskegon, Mich., a corporation of Michigan
Filed June 10, 1965, Ser. No. 462,829
8 Claims. (Cl. 280—124)

The suspension of this invention is especially adapted for the use of air springs in commercial vehicles and can be used as a single-axle unit or in tandem arrangements of two or more axles.

The inherent lack of lateral stability of an air spring, which essentially is an air-inflated bag, has necessitated in previous air suspensions the use of relatively complicated systems of torque rods, lateral stabilizer bars, bolsters, and the like, especially in tandem structures. Such equipment is relatively heavy and reduces the amount of payload which can be carried by the vehicle where load restrictions are in force. Moreover, such equipment is expensive and gives rise to design problems in the relatively crowded understructures of commercial vehicles.

The object of this invention is to provide a simple, light-weight, relatively inexpensive air spring suspension structure which eliminates the necessity for torque rods, stabilizer bars, bolsters, and the like and which can be used in either single- or multiple-axle arrangements.

In general, the invention contemplates the use of substantially rigid control arms extending longitudinally away from pivotal mounts at opposite sides of the vehicle, the springs being disposed in load-transmitting relation between portions of the arms and vehicle frame.

A substantially rigid wheel-carrying axle is attached to the arms, and each axle attachment includes two pins which extend generally parallel to the axle, the pins being spaced apart to provide a broad base for support against lateral thrust on the control arms and against drive or braking torque on the axle. Bodies of rubber or the like are confined between the pins and adjacent portions of the axle attachments. The arms and their pivotal mounts and the axle and axle attachments are capable of themselves of withstanding the torsional and lateral forces thereon incidental to operation of the vehicle. In the accompanying drawings:

FIG. 1 is a fragmentary, generally elevational view of a vehicle having a suspension embodying the present invention.

FIG. 2 is an enlarged, fragmentary, sectional view on line 2—2 of FIG. 1.

Figure 3:
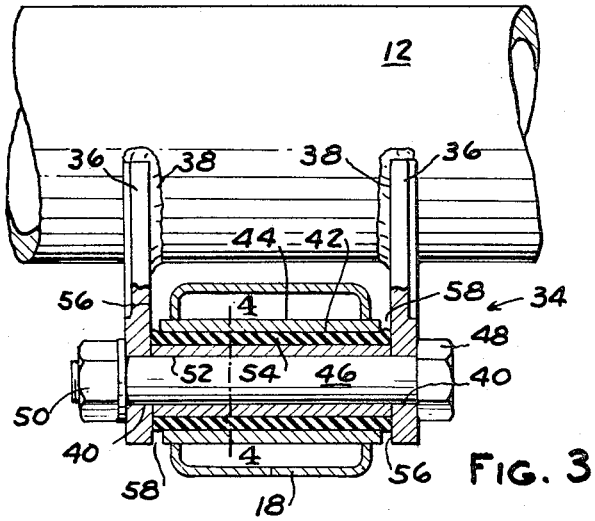
FIG. 3 is a further enlarged sectional view on line 3—3 of FIG. 2.
Figure 4:
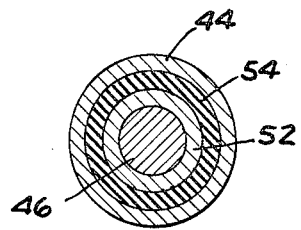
FIG. 4 is a sectional view on line 4—4 of FIG. 3.

Shown in the drawings is a vehicle frame 10 having an axle 12 and ground-engaging wheels 14 suspended therefrom by a suspension 16 according to the present invention. The suspension includes at each side of the vehicle frame a substantially rigid control arm 18 pivotally mounted on a bracket 20 depending from frame 10 as at 22. Pivotal mount 22 can be of any suitable conventional type and by way of example can comprise a rubber-bushed pin connecting the control arm to bracket 20.

Each control arm extends away from its pivotal mount in a direction which is longitudinal of vehicle frame 10 and each control arm has a portion 24 to which is secured an element 26 of an air spring 28, the other element 30 of the air spring being secured to the vehicle frame. A telescoping-type shock absorber 32 is connected between each control arm 18 and the vehicle frame to control rebound of the air spring and to limit downward swinging of the control arm to protect the air spring from being pulled apart.

Axle 12 is substantially rigid between its attachments 34 to control arms 18. In the forms of the invention illustrated, each attachment 34 includes two bracket plates 36 fixedly anchored on axle 12 as by welding 38 and straddling control arm 18. Each bracket plate has a pair of openings 40 aligned with a pair of openings 42 in the control arm. Openings 42 are defined by tubes 44 extending transversely through the control arm and being secured thereto as by welding.

A pin 46 extends through each set of aligned openings; and in the structure illustrated, each pin comprises a bolt having a head 48 and threaded nut 50 embracing the outer faces of bracket plates 36. Surrounding each pin 46 is a sleeve 52, and a body 54 of elastomeric material such as rubber or the equivalent is tightly confined between sleeve 52 and tube 44. The inner face 56 of each bracket plate 36 is spaced from the end of tube 44 as shown at 58.

As is brought out in greater detail below, the rigidity of axle attachments 34 is controlled by such factors as the width of control arms 18, the diameter, shape, and effective length of pins 46, the spacing between the pins, and the amount and distribution of elastomer material 54.

In use, it may be assumed initially that the vehicle is moving in a straight line over relatively even ground. Air springs 28 and shock absorbers 32 function conventionally to transmit cushioned load between control arms 18 and vehicle frame 10. When the vehicle traverses uneven ground, arms 18 at opposite sides of the vehicle will swing relative to each other. Elastomer bodies 54 and spaces 58 permit pins 46 to follow the movements of axle 12 and cock within tubes 44. When braking or driving torque is imposed on axle 12, the axle and axle attachments 34 will rock slightly about their mutual axis as permitted by distortion of elastomer bodies 54.

In tandem arrangements, when wheels 14 are dragged laterally during turning movements of the vehicle, the resulting lateral forces on the suspension are absorbed by arms 18, pivotal mounts 22, axle attachments 34, and the axle without further bracing or supporting structure. Air springs 28 are thereby also protected against such lateral forces. It is not necessary to provide a torsion rod between aligned pivotal mounts 22 at opposite sides of the vehicle. All forces on the suspension, with the sole exception of the vertical forces controlled by air springs 28 and shock absorbers 32, are controlled by the suspension members themselves.

Figure 8:
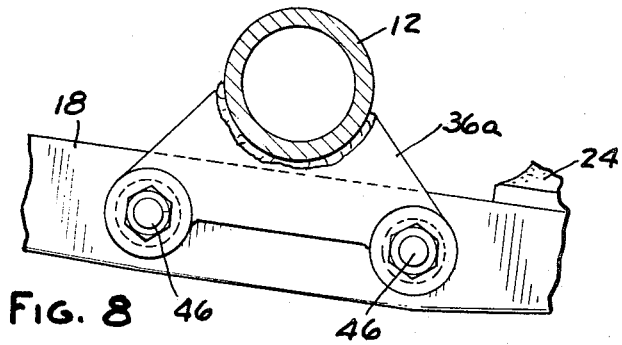
FIG. 8 is a fragmentary sectional view illustrating a modified axle attachment.

In a given suspension, it may be desired to provide relatively great support against driving or brake torque on axle 12; and in such a case, bracket plates 36A (FIG. 8) are provided which have openings 40 spaced apart a greater distance longitudinally of control arms 18 than in bracket plates 36. Control arm openings 42 in this case are spaced commensurately further apart. This arrangement may also be provided when increased lateral stability is desired in the suspension.

Figure 9:
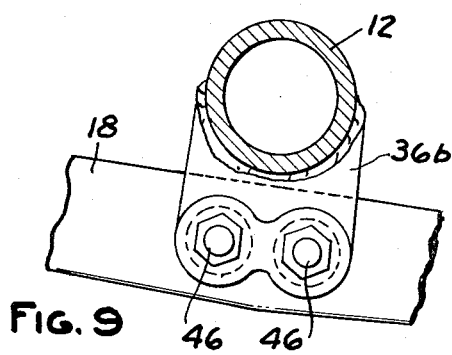
FIG. 9 is a view similar to FIG. 8 but showing a different modified axle attachment.

Conversely, if greater flexibility to axle torque or lateral forces is desired, bracket plates 36B (FIG. 9) having closely spaced openings 40 will be provided.

Figure 5:
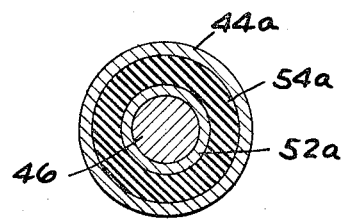
FIG. 5 is a view similar to FIG. 4 but showing a modified structure.
Figure 6:
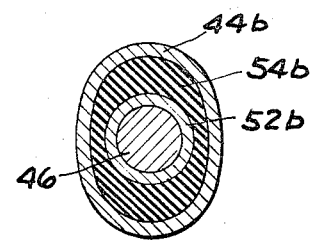
FIG. 6 is a view similar to FIG. 4 but showing a modified structure.
Figure 7:
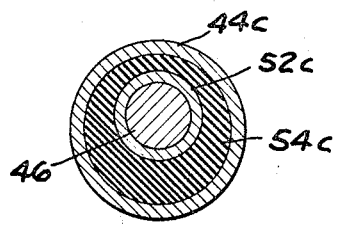
FIG. 7 is a view similar to FIG. 4 but showing a modified structure.

In suspensions where greater flexibility is required with respect to relative swinging movement of control arms 18, a greater thickness 54A of elastomer material may be provided between sleeve 52A and tube 44A as illustrated in FIG. 5. The effective length of pins 46 could also be shortened to obtain greater flexibility in this regard. The forces in axle attachments 34 can be further controlled in different ways by changing the distribution of the elastomer material as illustrated by the elliptical arrangement at 54B (FIG. 6) and the eccentric arrangement 54C (FIG. 7) or by providing a non-circular pin 46 and sleeve 52. In these figures, the corresponding reference characters are correspondingly postscripted.

Suspension 16 can be mounted on a vehicle in either a trailing position in which arms 18 trail pivots 22 or in pusher position in which the control arms extend forwardly from pivots 22. Axle 12 can either be a driven axle or a dead axle. Suspensions 16 can be mounted either in single arrangement on a vehicle or in multiple-axle tandem arrangements.

Axle 12 can be mounted either above control arms 18 as shown in solid lines in FIG. 2 or in the under-slung position shown in broken lines by merely orienting the axle-bracket assembly right-side up or upside down before securing it to the control arms by pin-bolts 46.

The rubber-bushed construction eliminates the necessity for numerous machined parts in axle attachments 34 and also relieves the metal components of much of the stress to which they would be subjected if rigid metal-to-metal connections were used. Wear is commensurately diminished. Nevertheless, the suspension is functionally so rigid that, for example, when pressure is lost from the air spring or springs at one side of the vehicle, the suspension prevents undue roll of the vehicle toward that side and the vehicle can continue to be used until repairs are made.

While it is contemplated that the suspension structure of this invention will have its greatest use with air springs, other types of springs such as coil springs or leaf springs can be used instead of air springs.

I claim:

1. In a vehicle having a frame with ground-engaging wheels suspended therefrom, improved suspension structure comprising,
    two substantially rigid arms secured to opposite sides of said frame through substantially aligned pivotal mounts, said arms extending away from their mounts in a direction which is longitudinal of said frame,
    spring means interposed in load-transmitting relation between said arms and frame,
    a substantially rigid wheel-carrying axle extending between said arms, an attachment between said axle and each of said arms,
    each of said attachments including means on said axle and respective arm which are secured together by a plurality of pins, said pins and at least one of said means being relatively movable so that said attachments can articulate,
    each of said pins being elongate in a direction transverse to the longitudinal extent of said arm and having a predetermined length, said pins having a predetermined spacing from each other,
    a body of elastomeric material tightly confined between each of said pins and said one means, said bodies having predetermined size and shape and providing yieldable resistance to articulation of said attachments,
    said predetermined length, spacing, and size and shape being so interrelated that said arms, pivotal mounts, axle, and attachments are cooperable of themselves to control torsional and lateral forces thereon incidental to operation of said vehicle.

2. The structure defined in claim 1 wherein said means includes a bracket fixedly secured to one of the elements defined as said axle and said respective arm, said bracket and the other of said elements having aligned holes through which said pins extend, said bodies of elastomeric material being confined between said pins and portions of said other element.

3. The structure defined in claim 1 wherein said means includes a bracket fixedly anchored on said axle, said bracket and respective arm having aligned holes through which said pins extend, said bodies of elastomeric material being confined between said pins and portions of said arm.

4. The structure defined in claim 3 wherein said bracket has spaced-apart portions which straddle said arm, and said holes in said brackets are provided in said spaced-apart portions.

5. The structure defined in claim 1 wherein said axle has a cross dimension in a direction which is longitudinal of said arm, the spacing between the centers of said pins in said direction being less than said cross dimension.

6. The structure defined in claim 1 wherein said axle has a cross dimension in a direction which is longitudinal of said arm, the spacing between the centers of said pins in said direction being at least a great as said cross dimension.

7. The structure defined in claim 1 wherein said axle has a cross dimension in a direction which is longitudinal of said arm, the spacing between the centers of said pins in said direction being greater than said cross dimension.

8. In a vehicle having a frame with ground-engaging wheels supended therefrom, improved suspension structure comprising,
    two substantially rigid arms secured to opposite sides of said frame through substantially aligned pivotal mounts, said arms extending away from their mounts in a direction which is longitudinal of said frame,
    spring means interposed in load-transmitting relation between said arms and frame, said spring means being of a type which, in use, are laterally unstable,
    a substantially rigid wheel-carrying axle extending between said arms, a bracket fixedly secured to said axle adjacent each of said arms,
    each of said brackets and adjacent arm having two aligned holes which are spaced apart in a direction longitudinal of the arm,
    a pin extending through each of the aligned holes and thereby providing attachments between said axle and arms, said pins extending horizontally substantially perpendicular to the longitudinal extent of said arms, said pins and their respective arms being relatively movable so that said attachments can articulate,
    a body of elastomeric material tightly confined between each of said pins and respective arms and providing yieldable resistance to articulation of said attachments,
    said bodies and pins being dimensioned and configured and so spaced that said arms, pivotal mounts, axle and attachments are cooperable of themselves to control torsional and lateral forces thereon incidental to opeartion of said vehicle and to stabilize said spring means against said lateral forces.

References Cited
UNITED STATES PATENTS 3,074,738    1/1963    Ward            280—104.5
3,137,923    6/1964    Schilberg        267—20

BENJAMIN HERSH, *Primary Examiner.*

P. GOODMAN, *Assistant Examiner.*